April 8, 1958  H. K. JENNY  2,830,224
MECHANICALLY AND ELECTRONICALLY TUNABLE CAVITY RESONATOR
Filed Oct. 1, 1954

INVENTOR.
HANS K. JENNY
BY
Charles H. Brown
ATTORNEY

United States Patent Office 2,830,224
Patented Apr. 8, 1958

2,830,224

MECHANICALLY AND ELECTRONICALLY TUNABLE CAVITY RESONATOR

Hans K. Jenny, Whippany, N. J., assignor to Radio Corporation of America, a corporation of Delaware Application October 1, 1954, Serial No. 459,679

8 Claims. (Cl. 315—5.53)

This invention relates to mechanically and electronically tunable cavity resonators, and more particularly to cavity resonators for coupling to an electron discharge device such as a magnetron, a klystron, or a traveling wave tube, to effect mechanical and electronic tuning of the discharge device.

A magnetron may be tuned by tuning a cavity resonator coupled to a resonator in the magnetron. A mechanically tunable cavity resonator is one wherein the frequency change is the result of mechanical motion, as for example, the motion of a tuning plunger. An electronically tunable cavity resonator is one wherein the frequency change is the result of the injection of electrons into or thru the cavity resonator, in the presence of a magnetic field. The center frequency of the magnetron may be adjusted by mechanically adjusting a tuning cavity resonator coupled thereto, and the magnetron frequency may be rapidly modulated with intelligence by modulating an electron beam injected into the tuning cavity resonator.

An electron beam is most effective in tuning a cavity resonator if the beam passes thru the region of maximum electric field strength in the cavity resonator. It has been found that with prior art arrangements, the mechanical tuning of the cavity resonator causes a shift in the position of the point of maximum electric field strength in the cavity resonator. Since the electron beam is fixed in position in the tuning cavity resonator, it is apparent that resulting changes in the electric field strength in the region traversed by the electric beam will result in changes in the effectiveness or efficiency of the electron beam.

It is an object of this invention to provide an improved mechanically and electronically tunable cavity resonator wherein the tuning effectiveness of the electron beam is not affected by the position of the mechanical tuning means.

It is another object to provide an improved tuning cavity resonator which is relatively simple and economical to manufacture.

In one aspect the invention comprises a cavity resonator having two parallel outer walls. The cavity resonator may be cylindrical or in the form of a parallelepiped. The cavity resonator includes a re-entrant portion having two inner walls parallel to the two parallel outer walls of the cavity resonator. The structure is such that a U-shaped region or cavity is formed in the cavity resonator. Tuning plungers are mounted between the re-entrant portion and the parallel outer walls of the cavity resonator to define the ends of the arms of the U-shaped region. An electron gun is mounted to inject a stream of electrons thru the base portion connecting the arm of the U-shaped region. The length of the U-shaped region from one tuning plunger to the other is electrically a half-wavelength. As the tuning plungers are simultaneously moved, the point of maximum electric field strength in the center of the half-wavelength remains at the same point, which point is traversed by the electron beam. Therefore, the cavity resonator may be mechanically tuned without impairing the tuning effectiveness of the electron beam.

These and other objects and aspects of the invention will be apparent to those skilled in the art from the following more detailed description taken in conjunction with the appended drawings wherein.

Figure 1:
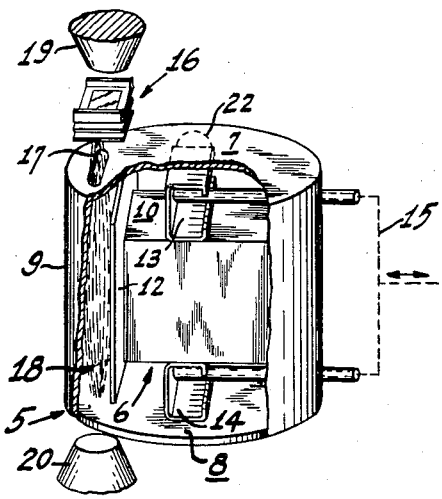
Figure 1 is a cut-away perspective view of a mechanically and electronically tunable cavity resonator constructed according to the teachings of this invention.
Figure 2:
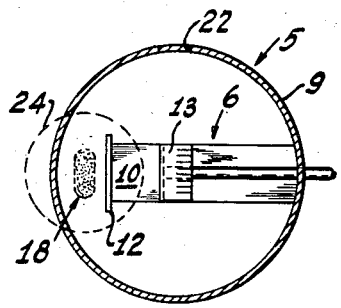
Figure 2 is a view looking down into the cavity resonator of Figure 1 with the top of the cavity removed.
Figure 3:
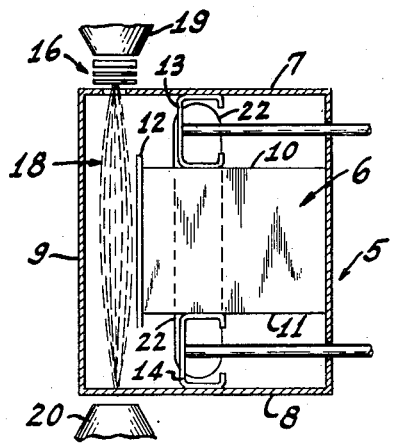
Figure 3 is a sectional view looking into the side of the cavity resonator of Figure 1 with the cylindrical side wall removed.

Referring to the mechanically and electronically tunable cavity resonator shown in Figures 1, 2 and 3 of the drawings, the cavity resonator is re-entrant with an outer shell 5 and a re-entrant member 6. The shell 5 has parallel end walls 7 and 8, and a cylindrical side wall 9. Alternatively, the shell 5 may have rectangular side walls. The re-entrant portion 6 has a wall 10 in parallel spaced relationship with the end wall 7 of shell 5, and a second wall 11 in parallel spaced relationship with end wall 8 of the shell 5.

The end of the re-entrant member 6 is provided with a plate or flange 12. A tuning plunger 13 is effective between the wall 10 of re-entrant member 6 and the end wall 7 of the shell 5. Similarly, a tuning plunger 14 is effective between the wall 11 of re-entrant member 6 and the end wall 8 of the shell 5. The tuning plungers 13 and 14, respectively, electrically engage the aforementioned walls and are ganged together as represented by the dashed line 15 so that they can be simultaneously synchronously moved along the re-entrant member 6.

As thus far described, the cavity resonator includes a U-shaped region or cavity extending from the tuning plunger 13 around the end plate 12 of the re-entrant member 6 to the tuning plunger 14. The distances of plungers 13 and 14 from the end plate 12 are the same. The purpose of the end plate 12 on the re-entrant member 6 is to lengthen the electrical path without correspondingly increasing the size of the resonant cavity. It will be seen that the positions of the tuning plungers 13 and 14 determine the ends of the arms of the U-shaped region. As the tuning plungers are moved in unison, the length of the U-shaped region and the effective volume thereof changes so that the circuit resonates at a frequency such that the length of the U-shaped region corresponds with an electrical half-wavelength at the operating frequency of the resonant circuit.

The half-wavelength U-shaped line has an electric field distribution such that the electric field is a maximum at the center of the base portion of the U-shaped region. This point of maximum electric field strength exists between the center of the plate 12 on the end of the re-entrant member 6 and the opposite cylindrical wall 9 (viz, the wall which plate 12 faces) of the shell 5. It will be apparent that as the tuning plungers 13 and 14 are moved, the point of maximum electric field strength remains in the same position.

A modulating electron beam is directed thru the region of maximum electric field strength from a modulating electron gun generally designated 16 which includes a cathode, a control grid and a screen grid. The beam enters the shell 5 thru a slot 17 in the end wall 7, and passes down to the end wall 8. Various energizing, accelerating and control or modulating potentials are applied to the electron gun 16 with respect to the shell 5 in any known manner. It is thus far apparent that a modulating electron beam, designated 18, always passes thru the region of maximum electric field strength of the resonant circuit regardless of the position to which the tuning plungers 13 and 14 may be set.

The entire region thru which the electron beam 18 passes is in a constant magnetic field established by a permanent magnet having pole pieces shown fragmentarily at 19 and 20. The direction of the magnetic lines of force are parallel with the general direction taken by the electrons of the beam 18. The constant magnetic field and the radio frequency electric field interact with the electrons to cause them to follow spiral paths in the electric field region and thus produce an interchange of reactive energy between the beam and the electric field which results in the tuning of the resonant circuit in accordance with the current of the electron beam, as described in a paper by Lloyd P. Smith and Carl I. Shulman entitled "Frequency modulation and control by electron beams," in Proceedings of the Institute of Radio Engineers, July 1947, pp. 644–657. The electron beam may be density modulated at a very high rate according to intelligence, as by the application of a signal voltage to the control grid of the modulating electron gun 16, to cause a corresponding frequency modulation of the tuning cavity resonator.

The cavity resonator may be coupled thru an iris 22 to a cavity resonant in an electron discharge device (not shown) such as a magnetron, a klystron or a traveling wave tube. The mechanical and electronic tuning of the tuning cavity resonator correspondingly affects the tuning or the output frequnecy of an electron discharge device to which the tuning cavity resonator is coupled.

The electron beam 18 must be in a vacuum. The vacuum envelope may be of dimensions represented by the dashed circle 24 in Figure 2, in which case the tuning plungers 13 and 14 are outside the vacuum. Alternatively, the vacuum envelope may be sufficiently large to include the entire tuning cavity resonator and associated electron discharge device. In this case, the tuning plungers 13 and 14 are operated within the vacuum envelope from outside the vacuum envelope by means of bellows or similar known constructions. According to a third arrangement, the tuning cavity resonator and the electron gun 16 are included in the vacuum envelope with a window closing the iris 22 and forming a part of the vacuum envelope.

It is apparent that according to this invention there is provided an improved mechanically and electronically tunable cavity resonator whereby the tuning effectiveness of an electron beam is undisturbed by the position of the mechanical tuning means.

What is claimed is:

1. A mechanically and electronically tunable cavity resonator comprising, conductive means forming a cavity having a U-shaped cross-section, said cavity being adapted to be excited to establish a transverse radio frequency electric field therein, tuning plungers determining the effective lengths of the arms of said U, and means to direct an electron beam thru the base portion of said U in a direction transverse to said electric field.

2. A mechanically and electronically tunable cavity resonator comprising, opposed conductive walls forming a cavity having a U-shaped volume, tuning plungers between opposite walls forming the arms of said U, and means to direct an electron beam between the opposite walls forming the base portion of said U.

3. A mechanically and electronically tunable cavity resonator comprising, opposed conductive walls forming a cavity having a U-shaped volume, tuning plungers between opposite walls forming the arms of said U, means to direct an electron beam along a path between the opposite walls forming the base portion of said U, and means to establish a magnetic field in said base portion and parallel to said path.

4. A cavity resonator as defined in claim 3 wherein said tuning plungers are ganged for simultaneous operation.

5. A resonant cavity as defined in claim 3, wherein the length of said U-shaped volume between said plungers is electrically a half-wavelength at the operating frequency.

6. A mechanically and electronically tunable cavity resonator comprising, conductive walls forming a re-entrant cavity wherein two opposite walls of the re-entrant portion are parallel with respective opposite walls of said cavity to form a U-shaped region, two ganged tuning plungers effective between the walls forming the arms of said U-shaped region and defining the ends thereof, means to direct a stream of electrons along a path between the cavity wall and the end of the re-entrant portion forming the base part of said U-shaped region, and means to generate a constant magnetic field in said base part and parallel to said path.

7. A cavity resonator as defined in claim 6, and in addition, a coupling iris in the wall of said cavity resonator for coupling to an electron discharge device.

8. A cavity resonator as defined in claim 6, wherein the length around the end of said re-entrant portion from one tuning plunger to the other is electrically one-half wavelength at the operating frequency.

References Cited in the file of this patent

UNITED STATES PATENTS

| Number | Name | Date |
|---|---|---|
| 2,284,405 | McArthur | May 26, 1942 |
| 2,305,884 | Litton | Dec. 22, 1942 |
| 2,394,908 | Gavin | Feb. 12, 1946 |
| 2,408,409 | Bowen | Oct. 1, 1946 |
| 2,458,556 | Bowen | Jan. 11, 1949 |
| 2,496,535 | Haglund et al. | Feb. 7, 1950 |
| 2,534,503 | Donal et al. | Dec. 19, 1950 |
| 2,599,237 | Cuccia | June 3, 1952 |